US005905463A

United States Patent [19]

Hannan

[11] Patent Number: 5,905,463

[45] Date of Patent: May 18, 1999

[54] LINEAR ARRAY AIRCRAFT ANTENNA WITH CONING CORRECTION

[75] Inventor: Peter W. Hannan, Smithtown, N.Y.

[73] Assignee: Marconi Aerospace Systems Inc. Advanced Systems Division, Greenlawn, N.Y.

[21] Appl. No.: 08/840,956

[22] Filed: Apr. 21, 1997

[51] Int. Cl.[6] .............................. H01Q 3/22; H01Q 1/28; G01S 5/04

[52] U.S. Cl. .......................... 342/373; 342/445; 343/893; 343/705

[58] Field of Search .................................... 342/147, 148, 342/149, 373, 423, 427, 445; 343/705, 770, 826, 853, 893

[56] References Cited

U.S. PATENT DOCUMENTS

| | | | |
|---|---|---|---|
| 4,616,230 | 10/1986 | Antonucci et al. | 342/373 |
| 5,214,436 | 5/1993 | Hannan | 343/705 |
| 5,457,466 | 10/1995 | Rose | 342/442 |
| 5,546,095 | 8/1996 | Lopez | 343/703 |

OTHER PUBLICATIONS

Skolnik, Merrill I. "Introduction to Radar Systems", McGraw–Hill, pp. 160, 161, 1980.

*Primary Examiner*—Mark Hellner
*Attorney, Agent, or Firm*—Edward A. Onders; Kenneth P. Robinson

[57] ABSTRACT

Aircraft-mounted Identification Friend or Foe (IFF) antennas employ a linear array of radiator elements positioned transverse to the boresight axis. With an azimuth determination capability, but lacking elevation resolution, such antennas are subject to coning errors in determining the azimuth bearing of a target at an altitude differential. With use of a linear array (10) of multi-radiator elements (11, 12, 13), an output signal (23) having the characteristic of an amplitude which increases for off-boresight targets is provided. That signal is compared to a typical form of antenna system output signal (22), which has an amplitude which decreases for off-boresight targets. By such amplitude comparison, the angle (β) to a target is determined and used to provide an azimuth correction factor (53). An apparent azimuth bearing (54) subject to coning error can then be corrected (55) to provide the true azimuth angle to a target (56).

21 Claims, 5 Drawing Sheets

LINEAR ARRAY AIRCRAFT ANTENNA WITH CONING CORRECTION

BACKGROUND OF THE INVENTION

This invention relates to linear array antennas aligned transverse to a forward beam direction and, more particularly, to such antennas utilizing a linear array of multi-radiator elements each of which includes two or more radiators in an end-fire configuration.

Identification Friend or Foe (IFF) systems are used to enable aircraft to transmit and receive signals for identification of other aircraft. Airborne radar systems are also used for target location without identification capabilities. The higher frequencies typically used for airborne radar permit use of antennas providing reasonable beam resolution both vertically and horizontally. Airborne linear array antennas used for IFF may, by contrast, lack the capability of providing vertical resolution. Without vertical, or elevation, resolving capability, no elevation information is provided by the system. Consider the example of a linear array antenna arranged to provide a vertical fan beam scannable side-to-side in azimuth. The straight vertical fan beam that the antenna provides in the on-boresight direction perpendicular to the linear array becomes curved or conical in shape when the beam is scanned off boresight. As a result, as illustrated in FIG. 1, if a target exists at a location (a) (15° right and at the same altitude as the reference aircraft) the IFF display would accurately indicate a target at 15° right. If however, a target were at location (b) (again 15° right, but at a higher altitude) the IFF display would indicate a target at azimuth (c), displaced from the actual 15° position of the target. The error is introduced by a "coning" of the antenna beam as it is scanned to the right and effectively assumes a profile of a form shown by curved beam profile (d). The resulting errors introduced by off-boresight coning of the IFF beam, in addition to affecting the accuracy of the IFF target display, can introduce a displacement between the IFF and radar returns displayed for the same target.

Although a linear array antenna arranged to use monopulse techniques does not produce a scannable fan beam, it can provide target azimuth information. However, when the target has an elevation bearing other than zero degrees, the azimuth information will be subject to the same azimuth errors as discussed with reference to FIG. 1.

The present inventor's prior U.S. Pat. No. 5,214,436, titled "Aircraft Antenna with Coning and Banking Correction", covers antennas providing coning correction by steerable beam configurations using multi-radiator elements having an effective center of radiation which can be shifted forward and backward. The full disclosure of U.S. Pat. No. 5,214,436 is hereby incorporated herein by reference.

Objects of the present invention are to provide new and improved linear array antenna systems employing coning error correction and such systems having one or more of the following advantages and characteristics:

- provision of an azimuth correction factor representative of coning error in signal reception from an off-boresight target;
- correction of target azimuth by use of an azimuth correction factor;
- absence of requirement for modification of a linear array configuration;
- absence of requirement for separate additional antenna;
- use of an available antenna output signal which is normally resistively dissipated; and
- use of signals typically available in monopulse signal processing configurations.

SUMMARY OF THE INVENTION

In accordance with the invention, a linear array antenna system with coning error correction includes a linear array of multi-radiator elements positioned side-by-side transverse to a boresight axis, each such element having at least a front radiator and a rear radiator. An excitation circuit is coupled to the elements and arranged to provide sum and difference signal outputs usable for determining azimuth bearing of a distant signal source by monopulse techniques. A first output port is coupled to the excitation circuit to provide a first output signal having an amplitude which is higher during reception from an on-boresight distant signal source than from such a source which is off-boresight (i.e., at a location which is not on the boresight axis forward of the antenna). A second output port is coupled to the excitation circuit to provide a second output signal having an amplitude which (over at least a range of angles) is lower during reception from an on-boresight distant signal source than from an off-boresight distant signal source. The antenna system also includes a signal processor: (i) responsive to the sum and difference signal outputs to determine an apparent azimuth bearing of the distant signal source; (ii) arranged to be coupled to the first and second output ports to provide an azimuth correction factor for the distant signal source, based upon amplitude comparison between the first and second output signals; and (iii) arranged to apply the azimuth correction factor to correct the apparent azimuth bearing determined for the distant signal source.

Also in accordance with the invention, a method of providing an azimuth correction factor representative of coning error in a linear array antenna system, includes the steps of:

(a) providing a linear array of multi-radiator elements transverse to a boresight axis, each of such elements including at least a front radiator and a rear radiator;

(b) providing, via an excitation circuit coupled to the elements, output signals representative of signals received from a distant signal source positioned off the boresight axis, including (i) a first output signal having an amplitude which is higher during reception from an on-boresight source than from an off-boresight source, and (ii) a second output signal having an amplitude which is lower during reception from an on-boresight source than from an off-boresight source over a range of angles;

(c) comparing the amplitude of the first and second output signals to develop an azimuth correction factor for the distant signal source;

(d) utilizing output signals provided in step (b) to determine an apparent azimuth bearing of the distant signal source by monopulse techniques; and (e) applying the azimuth correction factor to correct the apparent azimuth bearing determined for the distant signal source.

For a better understanding of the invention, together with other and further objects, reference is made to the accompanying drawings and the scope of the invention will be pointed out in the accompanying claims.

DESCRIPTION OF THE INVENTION

Figure 2:
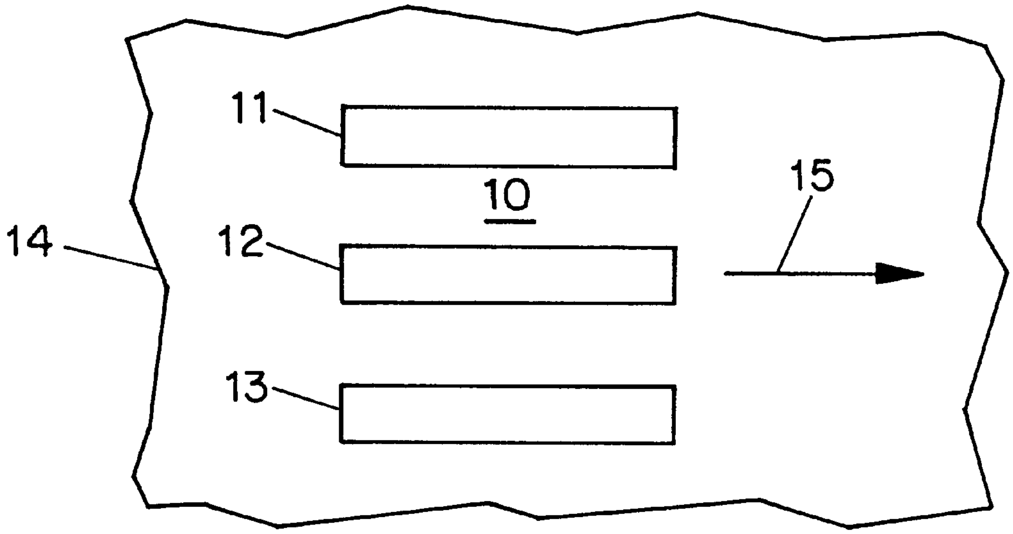
FIG. 2 is a simplified plan view of a transverse linear array of multi-radiator elements positioned transverse to an end-fire boresight axis.

FIG. 2 is a simplified plan view of the externally-visible portions of a linear array antenna system 10 with coning error correction, in accordance with the invention. Three multi-radiator elements 11, 12, 13 are mounted on a section 14 of the upper or lower nose portion of an aircraft fuselage. As illustrated, elements 11, 12, 13 are positioned side-by-side across or transverse to boresight axis 15 in a laterally spaced configuration. Boresight axis 15 is directed forward of the aircraft. In FIG. 2, rectangles 11, 12, 13 may be considered to represent the outlines of covers or small radomes each covering a plurality of slot or monopole radiators as will be discussed with reference to FIGS. 3 and 9.

Figure 3:
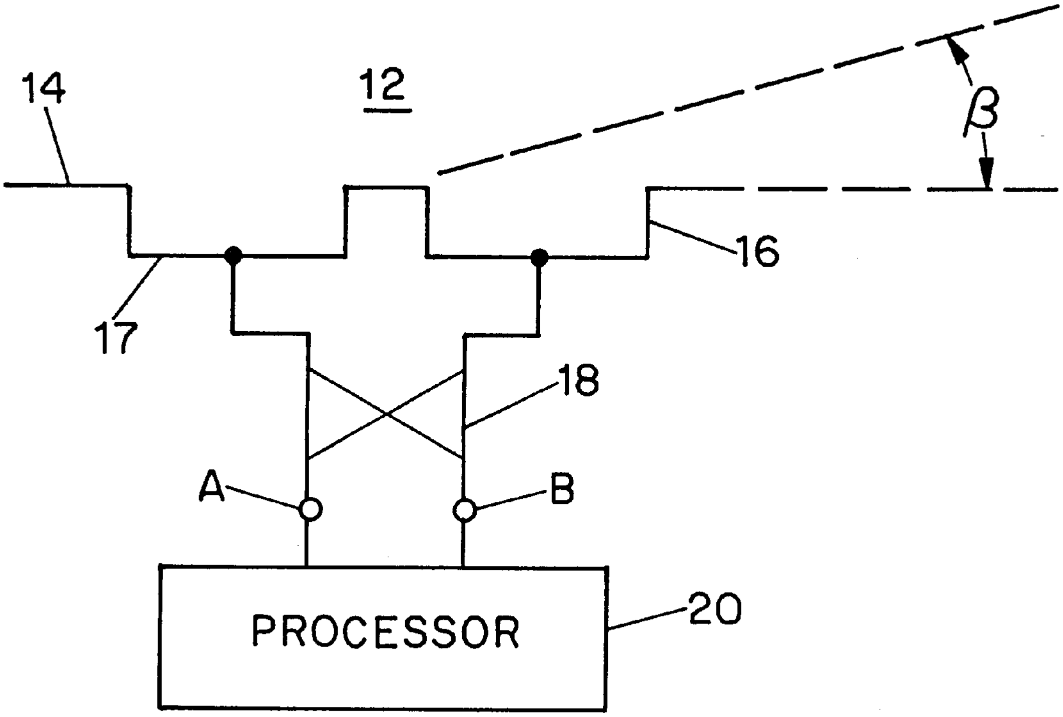
FIG. 3 is a conceptual side view of a two slot multi-radiator element with a directional coupler excitation circuit.
Figure 4:
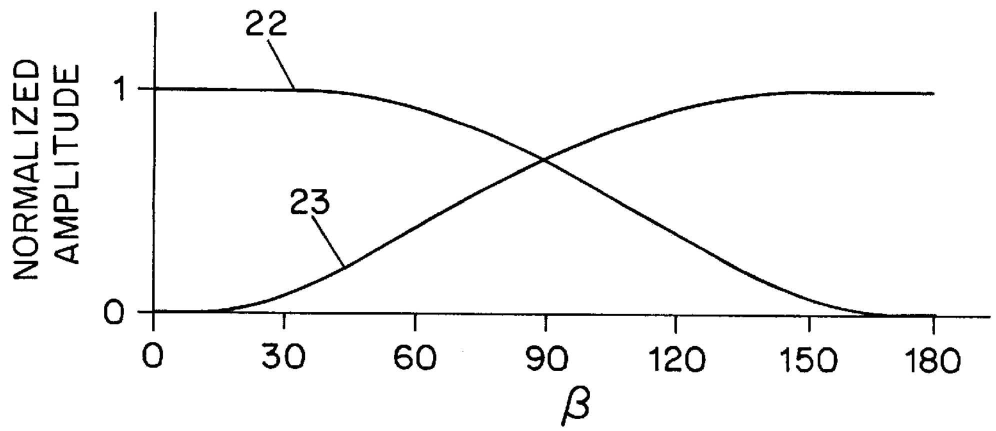
FIG. 4 shows normalized amplitude curves for signals from ports A and B of the FIG. 3 configuration.
Figure 5:
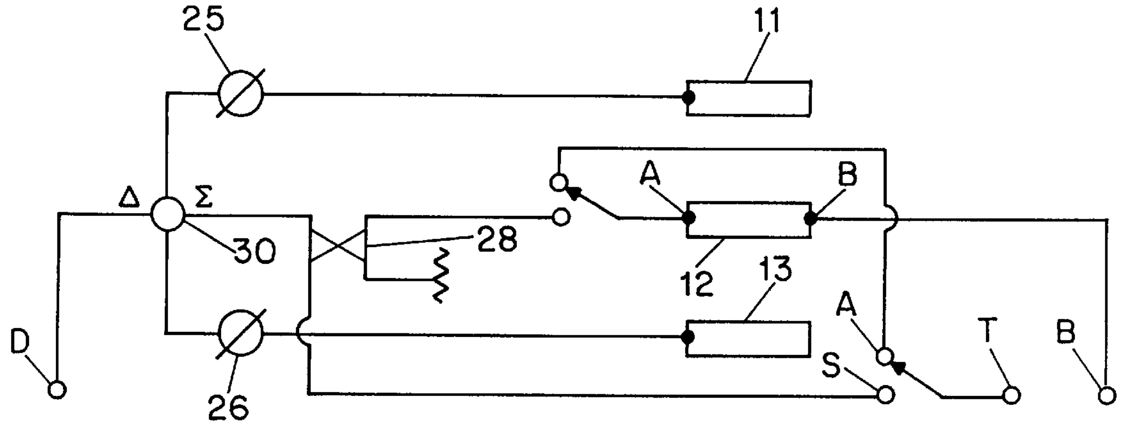
FIGS. 5, 6, 7 and 8 are conceptual plan views of different configurations of linear array antenna systems employing coning error correction in accordance with the invention.

As illustrated in the FIG. 3 representation of element 12, in a first embodiment each multi-radiator element 11, 12, 13 includes a front radiator 16 and a rear radiator 17. FIG. 3 is a conceptual side view showing radiators 16 and 17 as slot radiators of suitable form, typically having a center-to-center spacing of approximately one-quarter wavelength at a frequency in an operating band. Slot radiators are shown by way of example and in other implementations of the invention other types of radiators, such as monopoles, may be employed. The antenna system includes an excitation circuit including a 3 dB directional coupler 18 and other circuit elements which will be described with reference to FIG. 5. As illustrated in FIG. 3, coupler 18 is a four-port coupler having outputs of slots 16 and 17 respectively coupled to two ports thereof. During signal reception, first output port A of coupler 18 provides an output signal representative of a summation type combination of outputs from slot radiators 16 and 17, which is used for purposes of signal reception consistent with well-established usage. In a typical prior art application of a directional coupler in a basic configuration of this type, second output port B of coupler 18 would be resistively terminated to dissipate signals appearing at port B. With reference to FIG. 4, first output port A provides a first output signal 22 which has an amplitude which is higher during reception from an on-boresight distant signal source (i.e., zero degrees β) than from an off-boresight distant signal source (e.g., 70 degrees β). For present purposes, β is defined as the angular bearing of a distant signal source or target, relative to the boresight axis 15. Typically, a target will be off axis in both azimuth and elevation and the angle β represents the actual angle between the axis 15 and the target location (e.g., the resultant of both azimuth and elevation offset angles).

As stated, in accordance with established practice the summation signal at first output port A is utilized for signal reception via slot radiators 16 and 17, and the signal at second output port B of coupler 18 has typically been terminated in accordance with established usage. Pursuant to the invention, however, it is recognized that second output port B of coupler 18 provides a second output signal having an amplitude which is lower during reception from an on-boresight distant signal source than from an off-boresight distant signal source. As illustrated in FIG. 4, curve 23 represents the second output signal, provided at port B, shown as having a zero amplitude for an on-boresight target and an amplitude which increases as angle β increases for off-boresight targets. As shown in FIG. 4, although the amplitude ratio between curves 22 and 23 is greatest when angle β is small, the port B signal of curve 23 is weak for small β angles and is easily corrupted by noise, reflections, frequency variations, and other factors. However, for larger β angles (e.g., greater than 30 degrees) the port B signal of curve 23 is significantly stronger. Fortunately, the coning error is small when angle β is small, so that the azimuth angle as derived will typically not require correction. In typical applications coning error correction will be appropriate only when angle β is large (e.g., greater than 30 degrees).

Figure 1:
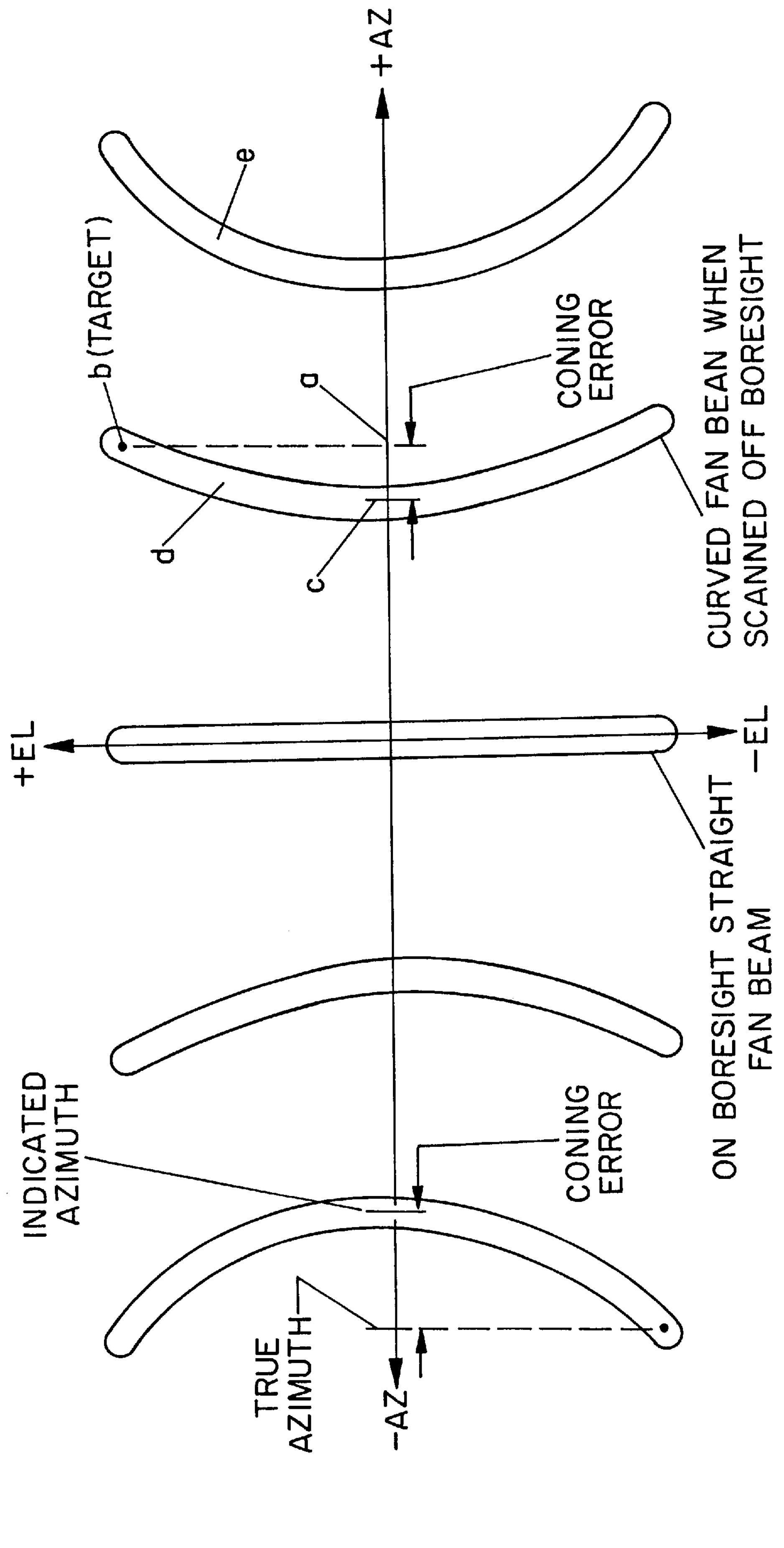
FIG. 1 illustrates coning errors for targets off axis in both azimuth and elevation.

The antenna system further includes a signal processor 20 also shown in FIG. 3 coupled to first and second output ports A and B. As will be further discussed, in particular applications signal processor 20 can be arranged to perform a number of types of signal processing, including known types of beam forming and monopulse processing operations. In accordance with the invention, in the FIG. 3 configuration, signal processor 20 is arranged to provide an azimuth correction factor based upon amplitude comparison between the port A first output signal and the port B second output signal, respectively represented by curves 22 and 23 of FIG. 4. As represented in FIG. 4, curves 22 and 23 may typically differ in amplitude by 18.2 dB at 30 degrees β, 12.6 dB at 45 degrees β, 7.7 dB at 60 degrees β, 4.9 dB at 70 degrees β, etc. Thus, by amplitude comparison of the A and B output signals the difference in amplitude can readily be correlated to the angle β known to be represented by such an amplitude difference, to provide an azimuth correction factor. Such factor can then be used with an azimuth determination made by the basic antenna system (which is subject to coning error as illustrated in FIG. 1) to provide a corrected azimuth bearing. Thus, as discussed further with reference to FIGS. 5–8, the excitation circuit can be arranged to provide sum and difference signal outputs usable for determining azimuth bearing of a distant signal source by monopulse techniques. To implement such azimuth determination, processor 20 is additionally arranged to apply such monopulse techniques to determine an apparent azimuth bearing of the signal source. Since such apparent azimuth bearing is subject to coning error as discussed above, processor 20 is also arranged to correct such apparent azimuth bearing by use of the azimuth correction factor. Signal processor 20 may include receiver circuitry for processing received signals and a microprocessor configuration suitable for providing monopulse signal processing, signal comparison and correction, and other operations, as can be provided by skilled persons after they have an understanding of the invention as described. Signal processor 20 will typically include one or more output ports (not shown) to provide access to derived signals, etc. and may include additional input ports.

FIG. 3 illustrates how first and second output signals usable in accordance with the invention can be provided directly from a single multi-radiator element. In complete antenna systems appropriate signals for deriving azimuth correction factors can be provided by other arrangements such as illustrated in FIGS. 5–8.

Signal Relationships

Assume that a target is actually located at an azimuth angle $\phi$ and an elevation angle $\theta$ relative to the boresight axis of a linear array antenna system. If, using monopulse techniques, the antenna system derives an indication that the target is positioned at an apparent azimuth angle $\alpha$, then the coning error angle $\delta$ will be equal to $\phi-\alpha$. Using principles of trigonometry, $$\sin\alpha=\sin\phi\cos\theta \tag{1}$$

$$\delta=\phi-\alpha=\phi-\arcsin(\sin\phi\cos\theta) \tag{2}$$

For small $\theta$ and $\phi$:

$$\delta \doteq \frac{\alpha\theta^2}{2} \tag{3}$$

As examples, corresponding values of $\delta$ are as follows:

| $\phi$ | $\theta$ | : | $\delta$ |
|---|---|---|---|
| 70° | 60° | : | 42° |
| 40° | 40° | : | 10.5° |
| 20° | 20° | : | 1.3° |

By derivation of an azimuth correction factor representative of angle $\beta$, as discussed above, the apparent azimuth angle $\alpha$ as derived on a monopulse basis can be corrected, that is converted to the true azimuth angle $\phi$ (in spherical coordinates). The following example is based on a simplified configuration whereby it is assumed that $\beta=0$ corresponds to $\theta=0$. This is accurate when the array is positioned on a level surface. (When the array is mounted in a forward position on an aircraft it may typically be positioned on an inclined surface. The angular offset resulting from the inclined surface can be compensated for in angle computations, by skilled persons after having an understanding of the invention.) By manipulation of direction cosines:

$$\sin^2\theta=\sin^2\beta-\sin^2\alpha \tag{4}$$

From equation (1):

$$\sin\phi = \frac{\sin\alpha}{\cos\theta} \tag{5}$$

From equation (4):

$$\cos\theta = \sqrt{1-\sin^2\beta+\sin^2\alpha} \tag{6}$$

Combining (5) and (6), for a level surface:

$$\sin\phi = \frac{\sin\alpha}{\sqrt{1-\sin^2\beta+\sin^2\alpha}} \tag{7}$$

Thus, knowledge of the angle $\beta$ allows correction of the apparent azimuth angle $\alpha$ to the true azimuth angle $\phi$ by use of equation (7).

Example (1), $\beta\equiv60°$, $\alpha\equiv30°$, then:
$\phi=45°$, also $\theta=45°$
In this example, $\delta=45°-30°=15°$ Example (2), $\beta\equiv\alpha$, then:
$\phi=\alpha$ and $\theta=0$ Example (3), $\beta\equiv75°$, $\alpha\equiv25°$, then:
$\phi=58.5°$, also $\theta=60.2°$
In this example, coning error $\delta=58.5°-25°=33.5°$

FIGS. 5–8 System Configurations

FIGS. 5–8 are simplified circuit diagrams illustrating a variety of implementations of an antenna system in accordance with the invention utilizing at least three multi-radiator elements 11, 12 13, which may each be of the type shown in FIG. 3, the type shown in FIG. 9 to be discussed below, or other appropriate type. In the FIG. 5 system, center element 12 is used to obtain both of the A and B signals (as shown in FIG. 3). As illustrated, a switching arrangement is used to bypass the beam forming network comprising phase shifters 25 and 26 and directional coupler 28 connected to hybrid junction 30. Ports D and S (via terminal T) are coupled to signal processor 20 during normal monopulse operation. Ports B and A (via terminal T) are coupled to signal processor 20 while the amplitudes of the A and B signals are being compared. It will be appreciated that, since the form of processor 20 to be coupled to ports D, T and B of FIG. 5 will include monopulse signal processing circuitry, it will be different than the simpler form of signal processor 20 described with reference to FIG. 3. In the arrangements of FIGS. 5–8 a circuit configuration for deriving monopulse type signals is shown to the left of multi-radiator elements 11, 12, 13 for purposes of illustration. In Application of the invention, circuit components such as elements 25, 26, 28 and 30 may actually be included within a configuration of signal processor 20, whose particular design, component complement and operation can be determined by skilled persons after having an understanding of the invention.

Figure 6:
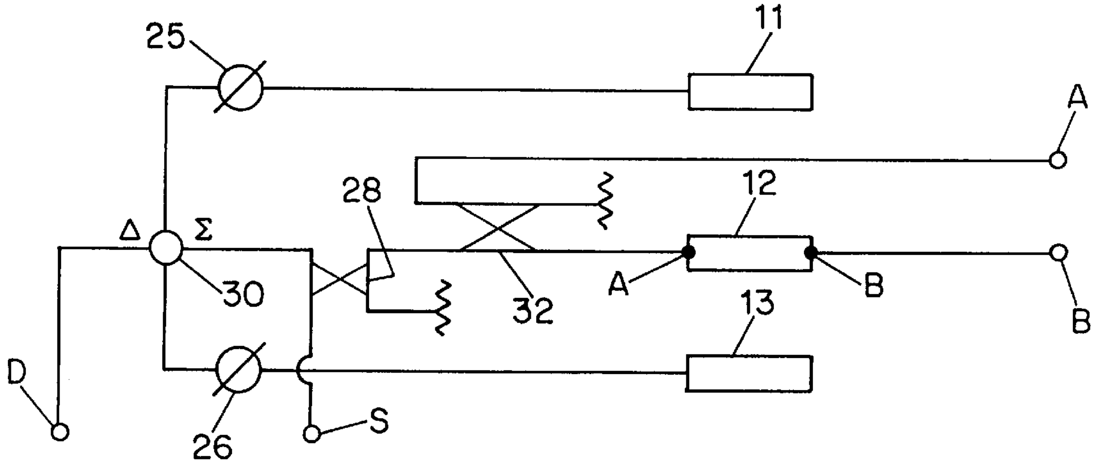
Figure 7:
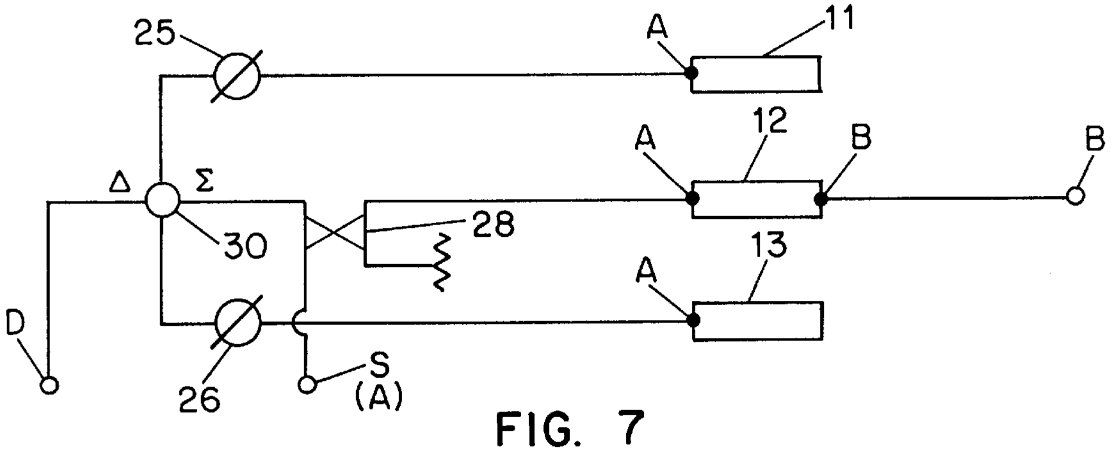
Figure 8:
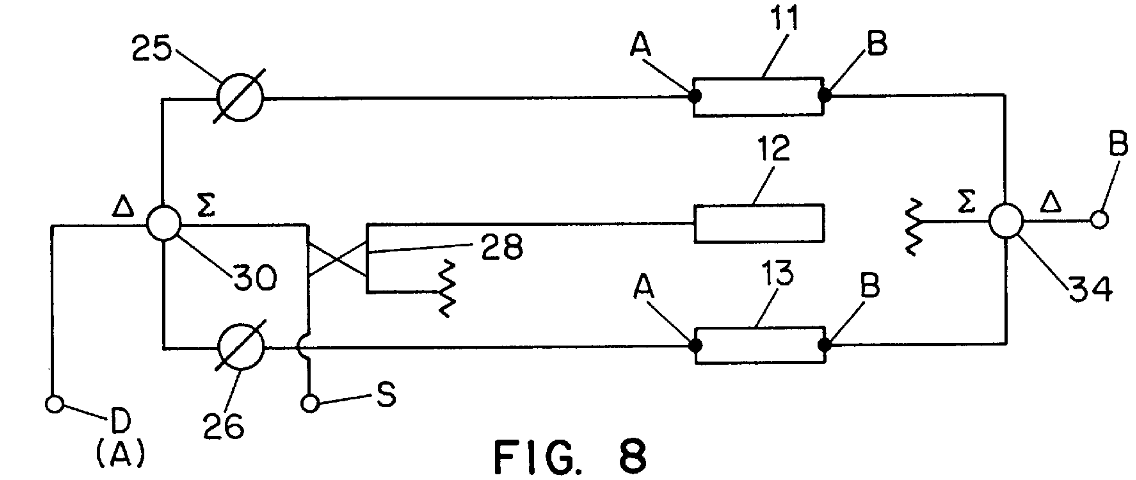

In the system of FIG. 6, a portion of the A signal is coupled out continuously via directional coupler 32 and used for amplitude comparison purposes. It will be appreciated that in some arrangements, appropriate signal amplitude normalization will be necessary for signal comparison purposes. In the FIG. 7 antenna system, the B signal from element 12 is compared to the A signal, which in this configuration takes the form of the composite monopulse sum signal S. In the FIG. 8 system, the B signal is in the form of a difference signal derived from multi-radiator elements 11 and 13 via hybrid junction 34. The A signal in this configuration comprises the composite monopulse difference signal D. It should be noted that the B difference signal as utilized in FIG. 8 has a null to the rear, so that it is less susceptible to reflections from an aircraft fuselage.

FIG. 9 Embodiment

Figure 9:
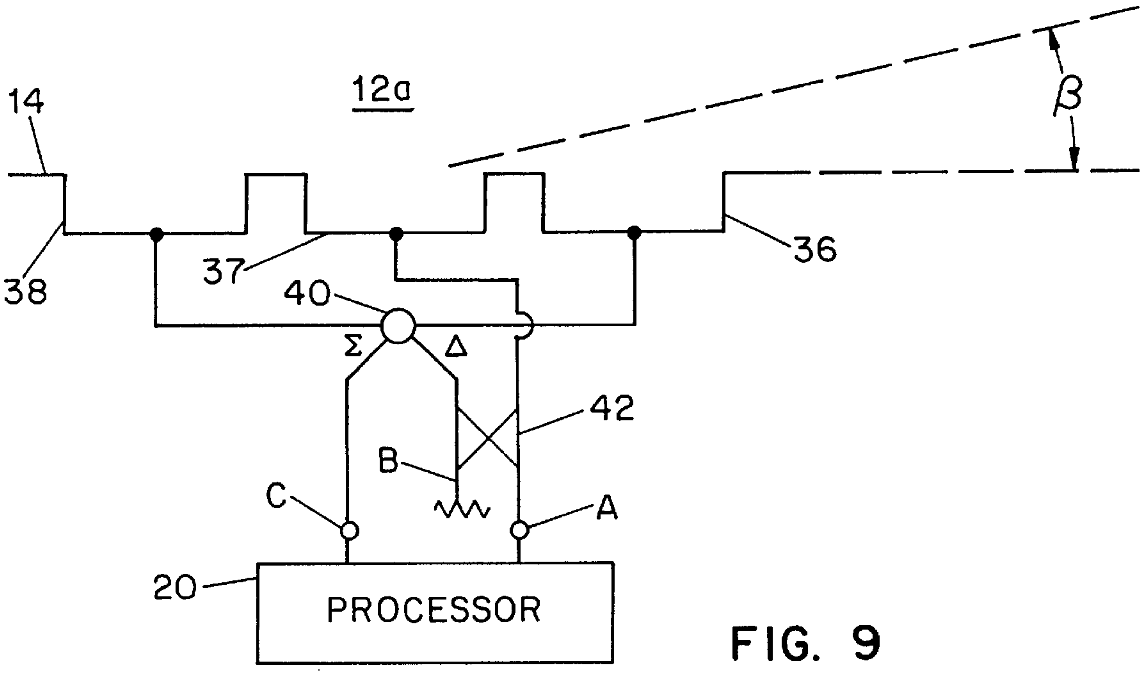
FIG. 9 is a conceptual side view of a three slot multi-radiator element with a hybrid junction/directional coupler type excitation circuit.

Referring now to FIG. 9, there is shown a conceptual side view of a multi-radiator element 12*a* including three slot radiators, which is usable in linear array antenna systems in accordance with the invention (such as shown in FIGS. 5–8). The multi-radiator element of FIG. 9 provides higher forward gain and less rearward radiation.

As shown in FIG. 9, the three-radiator element 12*a* includes a linear arrangement of slot radiators 36, 37, 38 with quarter wavelength center-to-center separations. Front slot 36 and rear slot 38 are coupled to two ports of a four port hybrid junction 40. Center slot 37 and the difference output port of junction 40 are connected to a 4.2 dB directional coupler 42. The A signal output port of coupler 42 is coupled to signal processor 20 and, in this embodiment, the B signal output port of coupler 42 is resistively terminated. The sum output port of junction device 40 provides a C signal, which is also coupled to processor 20. With this circuit configuration, excitation of slot radiators 36, 37, 38 results in signal voltages at the A, B, C ports having the following amplitude relationships:

| Radiator: | 38 | 37 | 36 |
|---|---|---|---|
| Port A | j | 2 | −j |
| Port B | −j | 1 | j |
| Port C | 1 | 0 | 1 |

Figure 10:
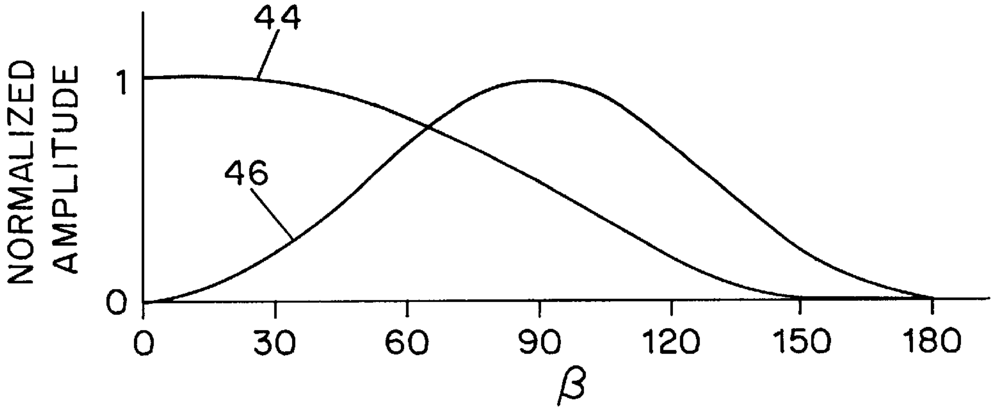
FIG. 10 shows normalized amplitude curves for signals from ports A and C of the FIG. 9 configuration.

For an antenna system using FIG. 9 type multi-radiator elements, port A and port C signal amplitudes are as illustrated in FIG. 10. In typical prior applications of the FIG. 9 type element, signals at both of ports B and C were dissipated by termination. Pursuant to the present invention, the port C signal 46 is utilized as a signal having an amplitude which is lower during reception from an on-boresight distant source signal than from an off-boresight distant signal source, for a range of angles. As shown in FIG. 10, the C signal 46 exhibits such characteristic up to 90 degrees off the boresight axis. Signal 46 is suitable for use in accordance with the invention, since it provides a predetermined amplitude differential characteristic relative to the port A signal 44. The port B signal represents a rearward radiation pattern having a conical null in the forward region. In contrast, the port C signal represents a radiation pattern with strong radiation at right angles to the end-fire axis, and having nulls forward and rearward at midband. As illustrated in FIG. 10, the port C signal 46 is well suited for amplitude comparison in conjunction with the port A signal 44, for determining the angle β to a target in order to provide an azimuth correction factor in accordance with the invention. It will be appreciated that, depending upon the particular form of azimuth error correction utilized, the azimuth correction factor may be a value representing the angle β or a correction factor derived therefrom.

From FIG. 10 it can be observed that the amplitude of port C signal 46 increases about twice as fast as the amplitude of port B signal 23 shown in FIG. 4, and is approximately the same strength as the A signal 44 in the important region of angle β from about 45 degrees to 85 degrees off axis. In this region the ratio of amplitudes of C signal 46 to A signal 44 changes rapidly, enhancing the accuracy of determination of angle β for purposes of the invention. While this description has been in the context of the slot elements shown in FIG. 9, in other embodiments monopoles or other suitable radiating elements may be utilized.

FIG. 11 Method

Figure 11:
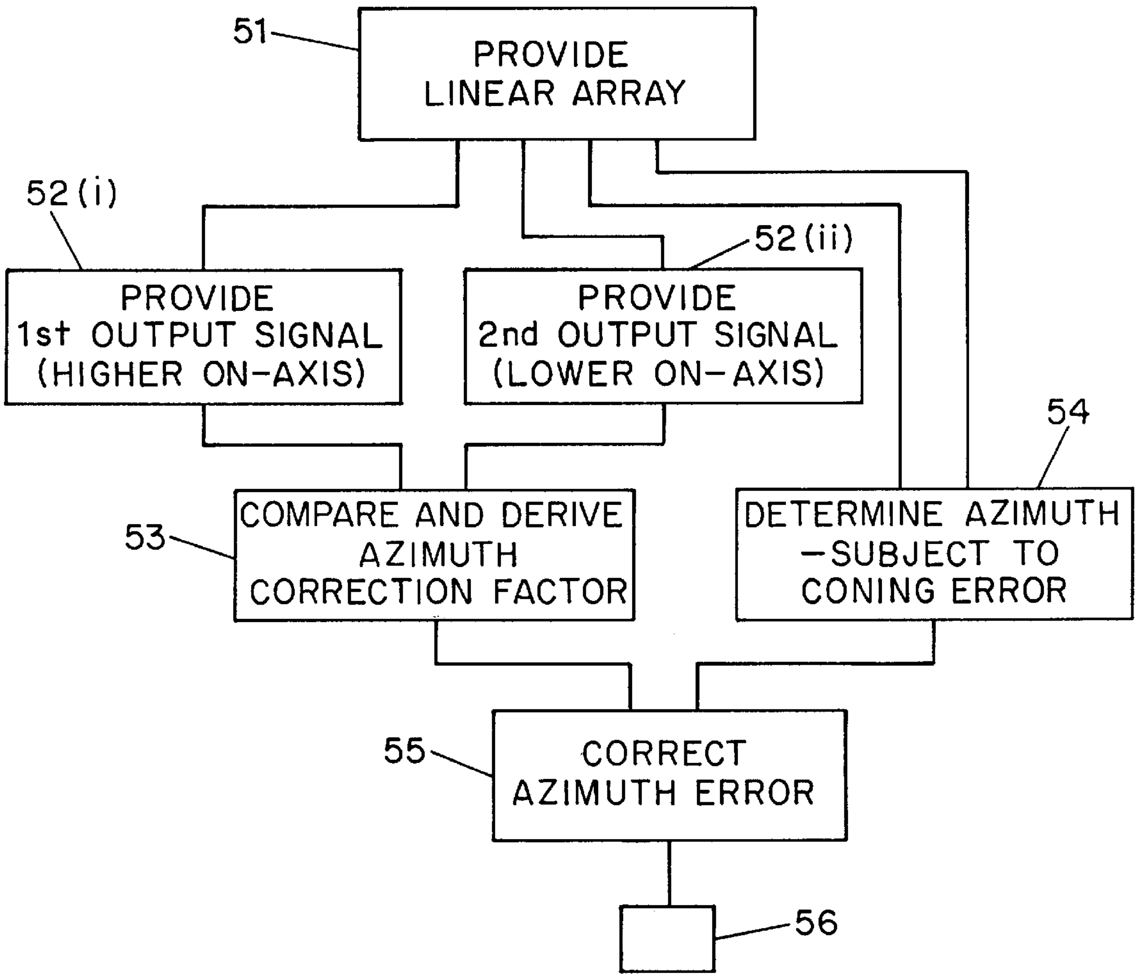
FIG. 11 is a flow chart useful in describing a method of providing an azimuth correction factor in accordance with the invention.

With reference to the FIG. 11 flow chart, a method of providing an azimuth correction factor representative of coning error in a linear array antenna system, includes the steps of:

(51) providing a linear array of multi-radiator elements transverse to a boresight axis, each of such elements including at least a front radiator and a rear radiator;

(52) providing, via an excitation circuit coupled to the elements, output signals representative of signals received from a distant signal source positioned off the boresight axis, including (i) a first output signal having an amplitude which is higher during reception from an on-boresight source than from an off-boresight source, and (ii) a second output signal having an amplitude which is lower during reception from an on-boresight source than from an off-boresight source over a range of angles; and (53) comparing the amplitude of the first and second output signals to develop an azimuth correction factor;

(54) utilizing output signals provided in step (52) to determine an apparent azimuth bearing of the distant signal source by monopulse techniques; and (55) applying the azimuth correction factor to correct the azimuth bearing of the distant signal source. Corrected azimuth bearing data for a distant signal source is thus made available at 56 in FIG. 11.

While there have been described the currently preferred embodiments of the invention, those skilled in the art will recognize that other and further modifications may be made without departing from the invention and it is intended to claim all modifications and variations as fall within the scope of the invention. In particular, the invention may be employed in a variety of types of linear array multi-radiator element antennas, including antennas providing a vertical fan beam which is horizontally scanned.

What is claimed is:

1. A linear array antenna system with coning error correction comprising:

a linear array of multi-radiator elements positioned side-by-side laterally transverse to boresight axis, each said element including a front radiator and a rear radiator longitudinally spaced relative to said boresight axis;

an excitation circuit arranged to couple signals to and from said elements;

said excitation circuit arranged to provide, at a second output port (B), a second output signal (23) representative of a difference between signals received by front and rear radiators of at least one of said multi-radiator elements and having an amplitude related to the elevation angle (β) of a distant signal source positioned off-boresight in elevation; and a signal processor arranged to be coupled to said second output port (B) to utilize said second output signal (23) to provide an azimuth correction representing a coning error correction with respect to the azimuth of said distant signal source.

2. A linear array antenna as in claim 1, wherein said excitation circuit includes a beam forming network.

3. A linear array antenna as in claim 2, wherein said excitation circuit includes at least one of a directional coupler and a hybrid junction having a port comprising said second output port.

4. A linear array antenna as in claim 1, wherein said linear array includes three multi-radiator elements each of which consists of two radiators.

5. A linear array antenna as in claim 4, wherein one of said multi-radiator elements has outputs of its front and rear radiators respectively coupled to two of the four ports of a four-port directional coupler, and the remaining ports of said directional coupler are said first and second output ports.

6. A linear array antenna as in claim 4, wherein each of said radiators is a slot radiator.

7. A linear array antenna as in claim 1, wherein said linear array includes three multi-radiator elements each of which consists of front, center and rear radiators positioned linearly.

8. A linear array antenna as in claim 7, wherein one of said multi-radiator elements has outputs of its front and rear radiators respectively coupled to two ports of a four-port junction device, said first output port is coupled to the center radiator of said element and a different output of said junction device via a directional coupler, and said second output port is coupled to a sum output port of said junction device.

9. A linear array antenna as in claim 7, wherein each of said radiators is a slot radiator.

10. A linear array antenna system with coning error correction, comprising:

a linear array of multi-radiator elements positioned side-by-side laterally transverse to boresight axis, each said element including at least a front radiator and a rear radiator longitudinally spaced relative to said boresight axis;

an excitation circuit coupled to said elements and arranged to provide sum and difference signal outputs usable for determining azimuth bearing of a distant signal source by monopulse techniques;

said excitation circuit arranged to provide, at a first output port (A), a first output signal (22) having an amplitude which is higher during reception from an on-boresight distant signal source than from an off-boresight distant signal source;

said excitation circuit arranged to provide, at a second output port (B), a second output signal (23) representative of a difference between signals received by front and rear radiators of at least one of said multi-radiator elements and having an amplitude related to the elevation angle (β) of a distant signal source positioned off-boresight in elevation; and a signal processor arranged to be coupled to said first and second output ports (A and B) to provide an azimuth correction representing a coning error correction.

11. A linear array antenna as in claim 10, wherein said linear array includes three multi-radiator elements each of which consists of two radiators.

12. A linear array antenna as in claim 11, wherein one of said multi-radiator elements has outputs of its front and rear radiators respectively coupled to two of the four ports of a four-port directional coupler, and the remaining ports of said directional coupler are said first and second output ports.

13. A linear array antenna as in claim 10, wherein said linear array includes three multi-radiator elements each of which consists of front, center and rear radiators positioned linearly.

14. A linear array antenna as in claim 13, wherein one of said multi-radiator elements has outputs of its front and rear radiators respectively coupled to two ports of a four-port junction device, said first output port is coupled to the center radiator of said element and a difference output of said junction device via a directional coupler, and said second output port is coupled to a sum output port of said junction device.

15. A method of providing an azimuth correction factor representative of coning error in a linear array antenna system, comprising the steps of:

(a) providing a linear array of multi-radiator elements laterally transverse to a boresight axis, each of said elements including at least a front radiator and a rear radiator longitudinally spaced relative to said boresight axis;

(b) providing, via an excitation circuit coupled to said elements, output signals representative of signals received from a distant signal source positioned off said boresight axis in elevation, including (i) a first output signal (22) having an amplitude which is higher during reception from an on-boresight source than from an off-boresight source, and (ii) a second output signal (23) representative of a difference between signals received by the front and rear radiators of at least one of said multi-radiator elements and having an amplitude related to the elevation angle (β) of a distant signal source positioned off-boresight in elevation; and (c) comparing the amplitude of said first and second output signals (22 and 23) to develop an azimuth correction factor representative of coning error.

16. A method as in claim 15, additionally comprising the steps of:

(d) determining an apparent azimuth bearing of said distant signal source by monopulse techniques; and (e) applying said azimuth correction factor to correct said apparent azimuth bearing of the distant signal source for coning error.

17. A method as in claim 15, wherein step (b) includes applying outputs of said front and rear radiators of a multi-radiator element to two ports of a four-port directional coupler to provide said first and second output signals at the remaining ports of said directional coupler.

18. A method as in claim 15, wherein step (b) includes applying outputs of said front and rear radiators of a multi-radiator element to two ports of a four-port junction device to provide said second output signal at a sum output port of said junction device.

19. A method as in claim 18, wherein step (a) includes providing a multi-radiator element including front, center and rear radiators and step (b) includes providing said first output signal based on a combination of signals from each of said front, center and rear radiators.

20. A linear array antenna as in claim 1, wherein:

said excitation circuit is additionally arranged to provide, at a first output port (A), a first output signal (22) having an amplitude which is higher during reception from an on-boresight distant signal source than from an off-boresight distant signal source;

said second output signal (23) has an amplitude which is lower during reception from an on-boresight distant signal source than from such a source which is off-boresight in elevation, over a range of angles; and said signal processor is arranged to be coupled to said first and second output ports (A and B) to provide said azimuth correction based upon amplitude comparison between said first and second output signals (22 and 23).

21. A linear array antenna as in claim 10, wherein said signal processor is (i) responsive to said sum and difference signal outputs to determine an azimuth bearing of said distant signal source, subject to coning error, (ii) arranged to provide an azimuth correction factor representing a coning error correction based upon amplitude comparison between said first and second output signals (22 and 23), and (iii) arranged to utilize said azimuth correction factor to offset said coning error.

* * * * *